United States Patent
Rezayee

(10) Patent No.: US 10,861,003 B1
(45) Date of Patent: Dec. 8, 2020

(54) NEAR FIELD COMMUNICATION DEVICE COUPLING SYSTEM

(71) Applicant: Square, Inc., San Francisco, CA (US)

(72) Inventor: Afshin Rezayee, Richmond Hill (CA)

(73) Assignee: Square, Inc., San Francisco, CA (US)

(*) Notice: Subject to any disclaimer, the term of this patent is extended or adjusted under 35 U.S.C. 154(b) by 1158 days.

(21) Appl. No.: 14/864,403

(22) Filed: Sep. 24, 2015

(51) Int. Cl.
*G06Q 20/32* (2012.01)
*H04B 5/00* (2006.01)
(Continued)

(52) U.S. Cl.
CPC ......... *G06Q 20/3278* (2013.01); *G06Q 20/12* (2013.01); *H04B 5/0031* (2013.01); *H04W 4/80* (2018.02)

(58) Field of Classification Search
CPC ............. G06Q 20/401; G06Q 20/3226; G06Q 20/3229; G06Q 20/3278; G06Q 20/20; G06Q 20/327; G06Q 20/322; G06Q 20/32; G06Q 20/3821; G06Q 20/40; G06Q 20/4012; G06Q 20/352; G06Q 20/3227; G06Q 30/06; G06Q 20/10; G06Q 20/325; G06Q 20/105; G06Q 20/3223; G06Q 20/409; G06Q 20/341; G06Q 20/3552; H04W 4/80; H04W 76/10; H04W 12/06; H04W 12/0608; H04W 88/02; H04W 4/02; H04W 4/029; H04W 4/18; H04W 4/21; H04W 8/205; H04W 12/02; H04W 12/0609; H04W 4/50; H04W 4/70; H04W 76/14; H04W 12/0013; H04W 12/00407; H04W 12/0023; H04W 12/0804; H04B 5/0031; H04B 5/0075; H04B 5/02;
(Continued)

(56) References Cited

U.S. PATENT DOCUMENTS

| 5,679,943 A | 10/1997 | Schultz et al. |
| 6,631,165 B1 | 10/2003 | Lambert et al. |

(Continued)

FOREIGN PATENT DOCUMENTS

| WO | 2015/128422 A1 | 9/2015 |
| WO | 2016/191299 A2 | 12/2016 |

OTHER PUBLICATIONS

Gebhart, M., et al., "Automated Antenna Impedance Adjustment for Near Field Communication (NFC)," 12th International Conference on Telecommunications (ConTEL), pp. 235-242 (Jun. 26-28, 2013).

(Continued)

*Primary Examiner* — Golam Sorowar

(74) *Attorney, Agent, or Firm* — Maynard Cooper & Gale, P.C.; Brian T. Sattizahn, Esq.

(57) ABSTRACT

A system for communicating data between two contactless contactless devices includes a carrier emitting device having a first antenna configured to transmit a wireless carrier signal. The system also has a first contactless device configured to operate in a first mode or a second mode. In the first mode, the first contactless device functions as an initiator to initiate communication with a second contactless device, using the wireless carrier signal provided by the carrier emitting device. In the second mode, the first contactless device functions as a target device transmitting data in response to a signal from another contactless device. The first contactless device receives a selection of the first mode or the second mode.

24 Claims, 6 Drawing Sheets

(51) Int. Cl.
*G06Q 20/12* (2012.01)
*H04W 4/80* (2018.01)

(58) Field of Classification Search
CPC .. H04B 5/0062; H04B 5/0025; H04B 5/0056; H04B 5/00; H04B 11/00; H04B 5/0037; H04B 1/38; H04B 1/3816; H04B 5/0081; H04B 7/15; G06K 19/0723; G06K 19/07707; G06K 19/0718; G06K 19/07722; G06K 19/07733; G06K 19/0716; G06K 19/02; G06K 19/06187; G06K 7/10237; G06K 19/045; G06K 19/0702; G06K 19/0717; G06K 19/072; G06K 7/01; G06K 7/10415; G06K 19/06206; G06K 19/0727

See application file for complete search history.

(56) References Cited

U.S. PATENT DOCUMENTS

| | | |
|---|---|---|
| 6,680,700 B2 | 1/2004 | Hilgers |
| 7,309,012 B2 | 12/2007 | Von Mueller et al. |
| 7,343,317 B2 | 3/2008 | Jokinen et al. |
| 7,471,204 B2 | 12/2008 | Safarian et al. |
| 7,813,314 B2* | 10/2010 | Fulknier ............... H04L 45/00 370/328 |
| 7,945,494 B2 | 5/2011 | Williams |
| 7,945,949 B2 | 5/2011 | Johnson |
| 8,189,552 B2* | 5/2012 | Moeller ............... H04W 76/18 370/338 |
| 8,280,347 B2 | 10/2012 | Azimi et al. |
| 8,297,507 B2 | 10/2012 | Kayani |
| 8,302,860 B2 | 11/2012 | McKelvey |
| 8,336,771 B2 | 12/2012 | Tsai et al. |
| 8,466,830 B2* | 6/2013 | Kanamoto ............... G01S 3/74 342/107 |
| 8,573,486 B2 | 11/2013 | McKelvey et al. |
| 8,798,537 B2 | 8/2014 | Lee et al. |
| 8,804,517 B2* | 8/2014 | Oerton ............... H04W 72/10 370/235 |
| 8,876,003 B2 | 11/2014 | McKelvey |
| 8,880,055 B1* | 11/2014 | Clement ............ G06Q 20/3278 455/410 |
| 9,047,598 B1 | 6/2015 | McKelvey et al. |
| 9,235,735 B2 | 1/2016 | Peters et al. |
| 9,250,452 B1 | 2/2016 | Yap et al. |
| 9,256,769 B1 | 2/2016 | Lamfalusi et al. |
| 9,294,353 B2* | 3/2016 | Sewall ............... H04L 41/0253 |
| 9,306,401 B2 | 4/2016 | Lee et al. |
| 9,396,368 B1 | 7/2016 | Lamba et al. |
| 9,438,300 B1 | 9/2016 | Oliaei |
| 9,443,237 B2 | 9/2016 | McKelvey et al. |
| 9,460,322 B2 | 10/2016 | Lamfalusi et al. |
| 9,485,092 B2 | 11/2016 | Smets et al. |
| 9,503,178 B2 | 11/2016 | Lee et al. |
| 9,646,299 B1 | 5/2017 | Rezayee et al. |
| 9,760,883 B1 | 9/2017 | Wade |
| 9,781,549 B2 | 10/2017 | Lamba et al. |
| 9,924,513 B2* | 3/2018 | Sidhu ............... H04W 72/0453 |
| 9,936,337 B2 | 4/2018 | Lamba et al. |
| 10,019,703 B2 | 7/2018 | Weksler et al. |
| 10,033,435 B2* | 7/2018 | Wolf ............... H04B 5/0031 |
| 10,198,727 B1 | 2/2019 | Rezayee et al. |
| 10,430,784 B1 | 10/2019 | He et al. |
| 10,482,440 B1 | 11/2019 | White et al. |
| 2002/0194141 A1 | 12/2002 | Langensteiner et al. |
| 2004/0104268 A1 | 6/2004 | Bailey |
| 2005/0212693 A1 | 9/2005 | Friedrich |
| 2005/0242173 A1 | 11/2005 | Suzuki |
| 2005/0242927 A1 | 11/2005 | Friedrich |
| 2005/0247787 A1 | 11/2005 | Von Mueller et al. |
| 2005/0287966 A1 | 12/2005 | Yoshimi et al. |
| 2006/0097874 A1 | 5/2006 | Salesky et al. |
| 2006/0109123 A1 | 5/2006 | Carrender |
| 2006/0125598 A1 | 6/2006 | Fischer et al. |
| 2006/0125605 A1 | 6/2006 | Fischer et al. |
| 2006/0287964 A1 | 12/2006 | Brown |
| 2007/0025456 A1 | 2/2007 | McCrady |
| 2007/0026826 A1 | 2/2007 | Wilson |
| 2007/0030126 A1 | 2/2007 | Friedrich |
| 2007/0063048 A1 | 3/2007 | Havens et al. |
| 2007/0090927 A1 | 4/2007 | Potyrailo et al. |
| 2007/0287498 A1 | 12/2007 | Wang et al. |
| 2008/0177662 A1 | 7/2008 | Smith et al. |
| 2008/0237345 A1 | 10/2008 | Moullette et al. |
| 2008/0246667 A1* | 10/2008 | Symons ............ G06K 19/0723 343/702 |
| 2008/0317047 A1 | 12/2008 | Zeng et al. |
| 2009/0215394 A1 | 8/2009 | Dewan |
| 2010/0148928 A1 | 6/2010 | Yeager et al. |
| 2010/0191653 A1 | 7/2010 | Johnson et al. |
| 2010/0201314 A1 | 8/2010 | Toncich et al. |
| 2010/0277003 A1 | 11/2010 | Von Novak et al. |
| 2010/0314446 A1 | 12/2010 | Morley, Jr. |
| 2011/0086601 A1 | 4/2011 | Ali et al. |
| 2011/0112920 A1 | 5/2011 | Mestre et al. |
| 2011/0160896 A1 | 6/2011 | Kim |
| 2011/0165896 A1 | 7/2011 | Stromberg et al. |
| 2011/0174879 A1 | 7/2011 | Morley, Jr. |
| 2011/0198395 A1 | 8/2011 | Chen |
| 2012/0086284 A1 | 4/2012 | Capanella et al. |
| 2012/0095867 A1 | 4/2012 | McKelvey |
| 2012/0095870 A1 | 4/2012 | McKelvey |
| 2012/0193434 A1 | 8/2012 | Grigg et al. |
| 2012/0203610 A1 | 8/2012 | Grigg et al. |
| 2012/0271725 A1* | 10/2012 | Cheng ............... H04W 4/21 705/21 |
| 2013/0035051 A1 | 2/2013 | Mujtaba et al. |
| 2013/0040560 A1 | 2/2013 | Kennedy et al. |
| 2013/0073373 A1 | 3/2013 | Fisher |
| 2013/0084798 A1* | 4/2013 | Faithorn ............... H04W 76/14 455/41.1 |
| 2013/0084803 A1 | 4/2013 | Hall et al. |
| 2013/0109312 A1* | 5/2013 | Witschnig ............ H04B 5/0031 455/41.1 |
| 2013/0109446 A1 | 5/2013 | Phillips |
| 2013/0137371 A1 | 5/2013 | Haverinen |
| 2013/0248601 A1 | 9/2013 | Liang et al. |
| 2013/0325712 A1* | 12/2013 | Park ............... G06Q 20/28 705/41 |
| 2014/0001263 A1 | 1/2014 | Babu et al. |
| 2014/0052637 A1 | 2/2014 | Jooste et al. |
| 2014/0061301 A1 | 3/2014 | Cho et al. |
| 2014/0101056 A1 | 4/2014 | Wendling |
| 2014/0127995 A1 | 5/2014 | Hendricksen et al. |
| 2014/0129425 A1 | 5/2014 | Yang et al. |
| 2014/0138435 A1 | 5/2014 | Khalid |
| 2014/0187153 A1 | 7/2014 | Zhu et al. |
| 2014/0279546 A1 | 9/2014 | Poole et al. |
| 2014/0302788 A1 | 10/2014 | McKelvey |
| 2014/0323041 A1* | 10/2014 | Shana'a ............... H04B 5/0031 455/41.1 |
| 2014/0328488 A1 | 11/2014 | Caballero et al. |
| 2014/0330721 A1 | 11/2014 | Wang |
| 2015/0044964 A1 | 2/2015 | Khan et al. |
| 2015/0046324 A1 | 2/2015 | de la Cropte de Chanterac et al. |
| 2015/0118956 A1 | 4/2015 | Desai et al. |
| 2015/0162785 A1 | 6/2015 | Lee et al. |
| 2015/0186874 A1* | 7/2015 | Govindarajan ...... G06Q 20/382 705/65 |
| 2015/0195008 A1 | 7/2015 | Johnson et al. |
| 2015/0221149 A1* | 8/2015 | Main ............... G07C 9/00119 340/5.61 |
| 2015/0242764 A1 | 8/2015 | Subbaraj |
| 2015/0249485 A1 | 9/2015 | Ouyang et al. |
| 2015/0264554 A1 | 9/2015 | Addepalli et al. |
| 2015/0287022 A1 | 10/2015 | Granbery |
| 2015/0332240 A1 | 11/2015 | Harwood et al. |
| 2015/0332248 A1 | 11/2015 | Weksler et al. |
| 2015/0341073 A1 | 11/2015 | Ayala Vazquez et al. |
| 2015/0355251 A1 | 12/2015 | Pascolini |
| 2016/0012430 A1 | 1/2016 | Chandrasekaran et al. |

(56) References Cited

U.S. PATENT DOCUMENTS

| | | | |
|---|---|---|---|
| 2016/0050629 A1 | 2/2016 | Khesbak et al. | |
| 2016/0063463 A1 | 3/2016 | Min et al. | |
| 2016/0072556 A1* | 3/2016 | Lee ................. | H04B 5/0075 |
| | | | 455/41.1 |
| 2016/0126619 A1 | 5/2016 | Tenbroek et al. | |
| 2016/0142174 A1 | 5/2016 | Fine et al. | |
| 2016/0147239 A1 | 5/2016 | Yan et al. | |
| 2016/0156327 A1 | 6/2016 | Wang | |
| 2016/0189146 A1 | 6/2016 | Cattone | |
| 2016/0210613 A1 | 7/2016 | McGill | |
| 2016/0232515 A1 | 8/2016 | Jhas et al. | |
| 2016/0249157 A1 | 8/2016 | Fine | |
| 2016/0371716 A1 | 12/2016 | Aitenbichler et al. | |
| 2017/0004475 A1* | 1/2017 | White ............... | G06Q 20/204 |
| 2017/0200152 A1 | 7/2017 | Winkler et al. | |
| 2017/0290079 A1 | 10/2017 | Raj et al. | |
| 2017/0344976 A1* | 11/2017 | Lee .................. | G06Q 20/10 |
| 2018/0097531 A1 | 4/2018 | Kummaraguntla | |
| 2018/0295489 A1 | 10/2018 | Lamba et al. | |

OTHER PUBLICATIONS

Hao, H., et al., "A Parallel Topology for Inductive Power Transfer Power Supplies," IEEE Transactions on Power Electronics, vol. 29, No. 3, pp. 1140-1151 (Mar. 2014).
Non-Final Office Action dated Apr. 10, 2015 for U.S. Appl. No. 14/189,997, of Lamfalusi, M., et al., filed Feb. 25, 2014.
Non-Final Office Action dated Apr. 13, 2015, for U.S. Appl. No. 14/641,080, of McKelvey, J., M., et al., filed Mar. 6, 2015.
Notice of Allowance dated Aug. 18, 2015, for U.S. Appl. No. 14/641,080, of McKelvey, J., M., et al., filed Mar. 6, 2015.
Non-Final Office Action dated Nov. 20, 2015, for U.S. Appl. No. 14/641,080, of McKelvey, J.M., et al., filed Mar. 6, 2015.
Notice of Allowance dated Nov. 23, 2015 for U.S. Appl. No. 14/189,997, of Lamfalusi, M., et al., filed Feb. 25, 2014.
Non-Final Office Action dated Nov. 25, 2015, for U.S. Appl. No. 14/868,261, of Lamba, K., et al., filed Sep. 28, 2015.
Non-Final Office Action dated Jan. 6, 2016, for U.S. Appl. No. 14/866,128, of Rezayee, A., et al., filed Sep. 25, 2015.
Non-Final Office Action dated Feb. 25, 2016, for U.S. Appl. No. 14/979,407, of Lamfalusi, M., et al., filed Dec. 27, 2015.
Final Office Action dated Mar. 9, 2016, for U.S. Appl. No. 14/641,080, of McKelvey, J. M., et al., filed Mar. 6, 2015.
Notice of Allowance dated Mar. 18, 2016, for U.S. Appl. No. 14/868,261, of Lamba, K., et al., filed Sep. 28, 2015.
Notice of Allowance dated May 23, 2016, for U.S. Appl. No. 14/641,080, of McKelvey, J.M., et al., filed Mar. 6, 2015.
Notice of Allowance dated Jun. 13, 2016, for U.S. Appl. No. 14/979,407, of Lamfalusi, M., et al., filed Dec. 27, 2015.
Non-Final Office Action dated Aug. 5, 2016, for U.S. Appl. No. 14/866,128, of Rezayee, A., et al., filed Sep. 25, 2015.
Non-Final Office Action dated Oct. 25, 2016, for U.S. Appl. No. 14/868,247, of Lamba, K., et al., filed Sep. 28, 2015.
Non-Final Office Action dated Dec. 8, 2016, for U.S. Appl. No. 14/986,308, of Wade, J., filed Dec. 31, 2015.
Notice of Allowance dated Jan. 11, 2017, for U.S. Appl. No. 14/866,128, of Rezayee, A., et al., filed Sep. 25, 2015.
Non-Final Office Action dated Jan. 25, 2017, for U.S. Appl. No. 15/094,598, of Lamba, K., et al., filed Apr. 8, 2016.
Final Office Action dated Mar. 21, 2017, for U.S. Appl. No. 14/868,247, of Lamba, K., et al., filed Sep. 28, 2015.
Notice of Allowance dated Apr. 28, 2017, for U.S. Appl. No. 14/986,308, of Wade, J., filed Dec. 31, 2015.
Advisory Action dated May 26, 2017, for U.S. Appl. No. 14/868,247, of Lamba, K., et al., filed Sep. 28, 2015.
Notice of Allowance dated May 31, 2017, for U.S. Appl. No. 15/094,598, of Lamba, K., et al., filed Apr. 8, 2016.
Corrected Notice of Allowance dated Aug. 10, 2017, for U.S. Appl. No. 14/986,308, of Wade, J., filed Dec. 31, 2015.
Notice of Allowance dated Nov. 20, 2017, for U.S. Appl. No. 14/868,247, of Lamba, K., et al., filed Sep. 28, 2015.
Non-Final Office Action dated Feb. 12, 2018, for U.S. Appl. No. 14/859,034, of White, M. W., et al., filed Sep. 18, 2015.
Non-Final Office Action dated Apr. 20, 2018, for U.S. Appl. No. 14/858,940, of Grassadonia, B., et al., filed Sep. 18, 2015.
Non-Final Office Action dated May 17, 2018, for U.S. Appl. No. 14/865,789, of Rezayee, A., et al., filed Sep. 25, 2015.
International Search Report and Written Opinion for International Patent Application No. PCT/US2016/033601, dated Nov. 22, 2016.
Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.
Non-Final Office Action dated Dec. 21, 2018, for U.S. Appl. No. 15/692,995, of He, Y., et al., filed Aug. 31, 2017.
Non-Final Office Action dated Jan. 2, 2019, for U.S. Appl. No. 14/858,974, of Hernandez, M., et al., filed Sep. 18, 2015.
Non-Final Office Action dated Feb. 6, 2019, for U.S. Appl. No. 15/941,795, of Lamba, K., et al., filed Mar. 30, 2018.
Final Office Action dated Feb. 25, 2019, for U.S. Appl. No. 14/858,940, of Grassadonia, B., et al., filed Sep. 18, 2015.
Final Office Action dated Jul. 5, 2018, for U.S. Appl. No. 14/859,034, of White, M.W., et al., filed Sep. 18, 2015.
Notice of Allowance dated Sep. 19, 2018, for U.S. Appl. No. 14/865,789, of Rezayee, A., et al., filed Sep. 25, 2015.
Non-Final Office Action dated Nov. 20, 2018, for U.S. Appl. No. 14/859,034, of White, M.W., et al., filed Sep. 18, 2015.
Final Office Action dated Mar. 27, 2019, for U.S. Appl. No. 14/859,034, of White, M.W., et al. filed Sep. 18, 2015.
Notice of Allowance dated May 22, 2019, for U.S. Appl. No. 15/692,995, of He, Y., et al., filed Aug. 31, 2017.
Advisory Action dated Jun. 14, 2019, for U.S. Appl. No. 14/858,940, of Grassadonia, B., et al., filed Sep. 18, 2015.
Final Office Action dated Jun. 24, 2019, for U.S. Appl. No. 15/941,795, of Lamba, K., et al., filed Mar. 30, 2018.
Notice of Allowance dated Jul. 9, 2019, for U.S. Appl. No. 14/859,034, of White, M.W., et al., filed Sep. 18, 2015.
Final Office Action dated Jul. 11, 2019, for U.S. Appl. No. 14/858,974, of Hernandez, M., et al., filed Sep. 18, 2015.
Non-Final Office Action dated May 28, 2020, for U.S. Appl. No. 14/858,974, of Grassadonia, B., et al., filed Sep. 18, 2015.
Non-Final Office Action dated Oct. 9, 2019, for U.S. Appl. No. 15/941,795, of Lamba, K., et al., filed Mar. 30, 2018.
Advisory Action dated Oct. 11, 2019, for U.S. Appl. No. 14/858,974, of Grassadonia, B., et al., filed Sep. 18, 2015.
Notice of Allowance dated Feb. 19, 2020, for U.S. Appl. No. 15/941,795, of Lamba, K., et al., filed Mar. 30, 2018.
Corrected Notice of Allowability dated Apr. 17, 2020, for U.S. Appl. No. 15/941,795, of Lamba, K., et al., filed Mar. 30, 2018.
Non-Final Office Action dated Jun. 25, 2020, for U.S. Appl. No. 14/858,940, of Grassadonia, B., et al., filed Sep. 18, 2015.

* cited by examiner

NEAR FIELD COMMUNICATION DEVICE COUPLING SYSTEM

BACKGROUND

Merchants can implement different types of payment systems in order to receive payments from customers. One type of payment system that can be implemented by a merchant is a wireless and contactless payment system that uses near field communication (NFC) hardware and protocols. In an NFC-based contactless payment system, the merchant uses a reader device to wirelessly obtain payment information from a contactless payment device provided by the customer. The contactless payment device can include smart chip cards implementing the EMV (Europay, Mastercard, Visa) standard and portable electronic devices, such as smartphones or smart watches, that communicate via NFC and comply with payment standards.

In order to communicate with the contactless payment devices using NFC, the reader device emits a wireless carrier signal from an antenna, for example, at 13.56 MHz. The contactless payment device also has an antenna. When the contactless payment device is placed in close proximity to the reader, the two devices are inductively coupled via the wireless carrier signal. The contactless payment device is able to modulate the wireless carrier signal, for example, by modifying a load that is placed across the antenna of the contactless payment device. The reader device may receive the modulated wireless carrier signal from the payment device and process the signal to obtain the data from the payment device. The reader device can also modulate the transmitted carrier signal to communicate data to the payment device, which can similarly receive and process the modulated wireless carrier signal to obtain the transmitted data from the reader device. To avoid conflicts, the merchant's reader device functions as an initiator, while the purchaser's contactless payment device functions as a target.

In an NFC-based payment system, the reader device includes hardware and software for emitting the wireless carrier signal, including a relatively large antenna that may typically be implemented at a dedicated hardware device that is used with a fixed point-of-sale (POS) payment terminal. However, many merchants do not use a fixed POS system, but instead use a POS system that is incorporated in an application running on a portable electronic device carried by the merchant. Such merchants may be able to accept magnetic strip credit cards using a device that attaches to the portable electronic device. For NFC transactions, the portable electronic device may be able to operate as a payment device for performing purchases, but may not be configured to emit a wireless carrier signal in order to function as a merchant reader device.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
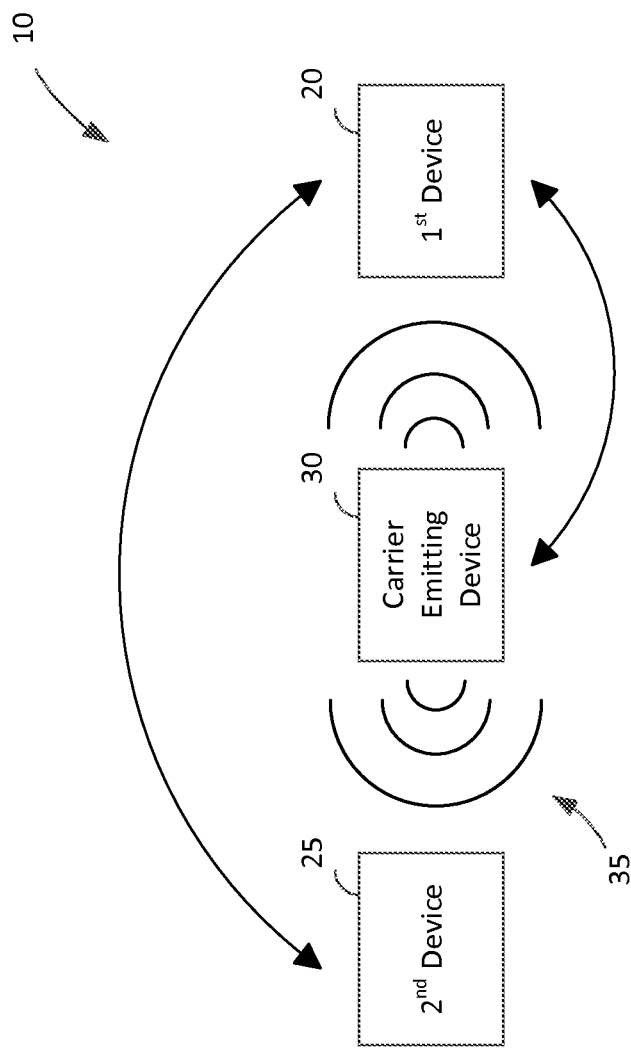
FIG. 1 shows an illustrative near field communication coupling system in accordance with some embodiments of the present disclosure.

A near field communication (NFC) coupling system enables two electronic contactless devices having NFC capabilities to communicate using NFC even though neither of the contactless devices emits a NFC wireless carrier signal. A first contactless communication device can be a portable electronic device, such as a smart phone, that has hardware and corresponding software installed in the portable electronic device. A second contactless device can be another NFC-capable portable electronic device or a smart chip card that operates according to a payment standard such as EMV standards.

A carrier emitting device (CED) may generate a wireless carrier signal having an appropriate waveform (e.g., a sine wave) and frequency (e.g., 13.56 MHz). The two contactless devices may then be placed in close proximity (e.g., less than 10 cm) to the CED. One of the contactless devices is a merchant device that functions as an NFC initiator, while the purchaser device (e.g., an NFC-capable smart phone or a smart chip card) operates normally as an NFC target device. The CED generates the wireless carrier signal such that the CED and both the merchant and purchaser devices are inductively coupled by the wireless carrier signal when both devices are placed in close proximity to the CED.

The two contactless devices may communicate with each other by modulating the carrier signal provided by the CED. The merchant contactless device may enter a mode where it functions as an initiator for NFC communications, and communicates by modulating the wireless carrier signal according to NFC initiator protocols. In some contactless devices, the user may be able to switch between a merchant/initiator mode and a purchaser/target mode. The purchaser contactless device is an NFC-capable contactless device, a smart chip card, or similar device, and modulates the wireless carrier signal according to NFC target protocols. The two contactless devices can use either passive or active modulation techniques to modulate the wireless carrier signal. The two contactless devices can then communicate with each other by demodulating the modulated wireless carrier signal.

The merchant contactless device includes hardware and software that allows it to modulate the wireless carrier signal such that it appears to the purchaser device as if it were a wireless data signal provided by the same device that generated the wireless carrier signal. In this manner, the merchant contactless device can operate like an NFC initiator device without generating the wireless carrier signal. The purchaser contactless device operates like a conventional NFC target device and modulates the carrier signal provided by the CED in a similar manner to an NFC target when not in coupling mode. The purchaser contactless device may not be aware that it is in communication with a coupled merchant device rather than a dedicated reader that emits its own wireless carrier signal.

A user is able to switch the merchant contactless device between a conventional mode in which the merchant device functions as a target and a coupling mode in which the merchant device functions as an initiator. Once the merchant contactless device is switched into coupling mode, and is placed into close proximity with a CED emitting a wireless carrier signal, it is able to communicate with a purchaser contactless device functioning as a target. The two contactless devices then communicate and transfer data according to NFC standards such as ISO 14443 and ISO 18092. Once the transaction is complete, the merchant contactless device can be switched out of coupling mode and can send an instruction to the CED to return the CED to its prior operational configuration.

The CED emits the wireless carrier signal. Some types of CEDs may perform multiple functions. One CED type may be a wireless inductive charger that may transmit at a similar frequency as NFC communications (e.g., 13.56 MHz). The same CED signal that provides the wireless charging functionality may also be used as a carrier signal for NFC communications. In one embodiment, the CED may function as a dual mode device, providing both the charging functionality and the NFC carrier functionality at the same time. A device located within the range of the near field and having compatible inductive charging circuitry may receive a charge, and by modulating the 13.56 MHz signal, may communicate using NFC. In some embodiments, the CED may be capable of operating in different modes. The CED may switch between a charging mode and a coupling mode, and aspects of the provided signal (e.g, waveform and power) may be modified based on the selected mode. The switching may be initiated by a user or may be initiated by a wireless transmission from the merchant contactless device. A reader device may also be switched into a coupling mode where it functions as a CED rather than an initiator. This may be initiated by a user or by a wireless transmission from the merchant contactless device.

FIG. 1 depicts an illustrative block diagram of a coupling system 10 in accordance with some embodiments of the present disclosure. In one embodiment, the coupling system 10 includes a first portable electronic device (first contactless device) 20, a second portable electronic device (second contactless device) 25 and a carrier emitting device 30 emitting a near field wireless carrier signal 35. The components of the coupling system 10 facilitate communication between the first contactless device 20 and the second contactless device 25, such as an electronic payment transaction between a merchant using the first contactless device 20 and a customer using the second contactless device 25 or an exchange of personal data, e.g., pictures, between people using the first contactless device 20 and the second contactless device 25.

The first contactless device 20 and the second contactless device 25 communicate data, such as payment information, using the near field 35 provided by carrier emitting device 30. The carrier emitting device 30 can emit a wireless carrier signal having an appropriate waveform and frequency (e.g., 13.56 MHz sine wave) for the near field 35. In some embodiments, CED 30 may not modulate the wireless carrier signal, or may only modulate the wireless carrier signal in limited circumstances, such that the first contactless device 20 and the second contactless device may communicate by modulating the wireless carrier signal. The first contactless device 20 and the second contactless device 25 can both modulate the near field 35 using different techniques to communicate data between the first contactless device 20 and the second contactless device 25.

The first contactless device 20 may be a portable electronic device such as a smart phone, tablet, or smart watch that is configured to operate as either an NFC target device or as an NFC initiator device, and that is capable of engaging in secure transactions using NFC. The first contactless device 20 may have hardware (e.g., a secure element including hardware and executable code) and/or software (e.g., executable code operating on a processor in accordance with a host card emulation routine) for performing secure transaction functions. When functioning as an initiator of wireless communications such as a payment transaction, the first contactless device 20 may be inductively coupled to the second contactless device 25 as depicted by near field 35 and may communicate with the second contactless device 25 by modulation of the wireless carrier signal provided by CED 30.

In some embodiments, the second contactless device 25 can be an EMV card, i.e., a credit card having an EMV chip. In other embodiments, the second contactless device 25 can be an electronic device such as a smart phone, tablet, or smart watch. The second contactless device 25 may be inductively coupled to the first contactless device 20 as depicted by near field 35 and may communicate with the first contactless device 20 using load modulation of the wireless carrier signal provided by CED 30. When the second contactless device 25 is an EMV card, it may include a secure integrated circuit that is powered by the near field 35 and capable of communicating with the first contactless device 20, generating encrypted payment information, and providing the encrypted payment information as well as other payment or transaction information (e.g., transaction limits for payments that are processed locally) in accordance with one or more electronic payment standards, such as those promulgated by EMVCo.

In one embodiment, the coupling system 10 can be used to facilitate an electronic payment transaction between a merchant and a customer. The coupling system 10 permits the second contactless device 25 to function as an NFC target/payment device and communicate with the first contactless device 20 functioning as an NFC initiator/reader device, in order to complete an electronic transaction and exchange payment information. The second contactless device 25 can be an EMV card, an NFC-enabled electronic device, or other similar device capable of engaging in payment transactions such as through a payment application. The first contactless device 20 can be an NFC-enabled electronic device executing a payment processing application that is capable of processing payment information (e.g., encrypted payment card data and user authentication data) and transaction information (e.g., purchase amount and point-of-purchase information). If the second contactless device 25 is an NFC-enabled electronic device, the coupling system 10 can be used to provide information about the completed transaction and additional information (e.g., receipts, special offers, coupons, or loyalty program information) to the second contactless device 25 for display on a screen of the second contactless device 25.

Figure 2:
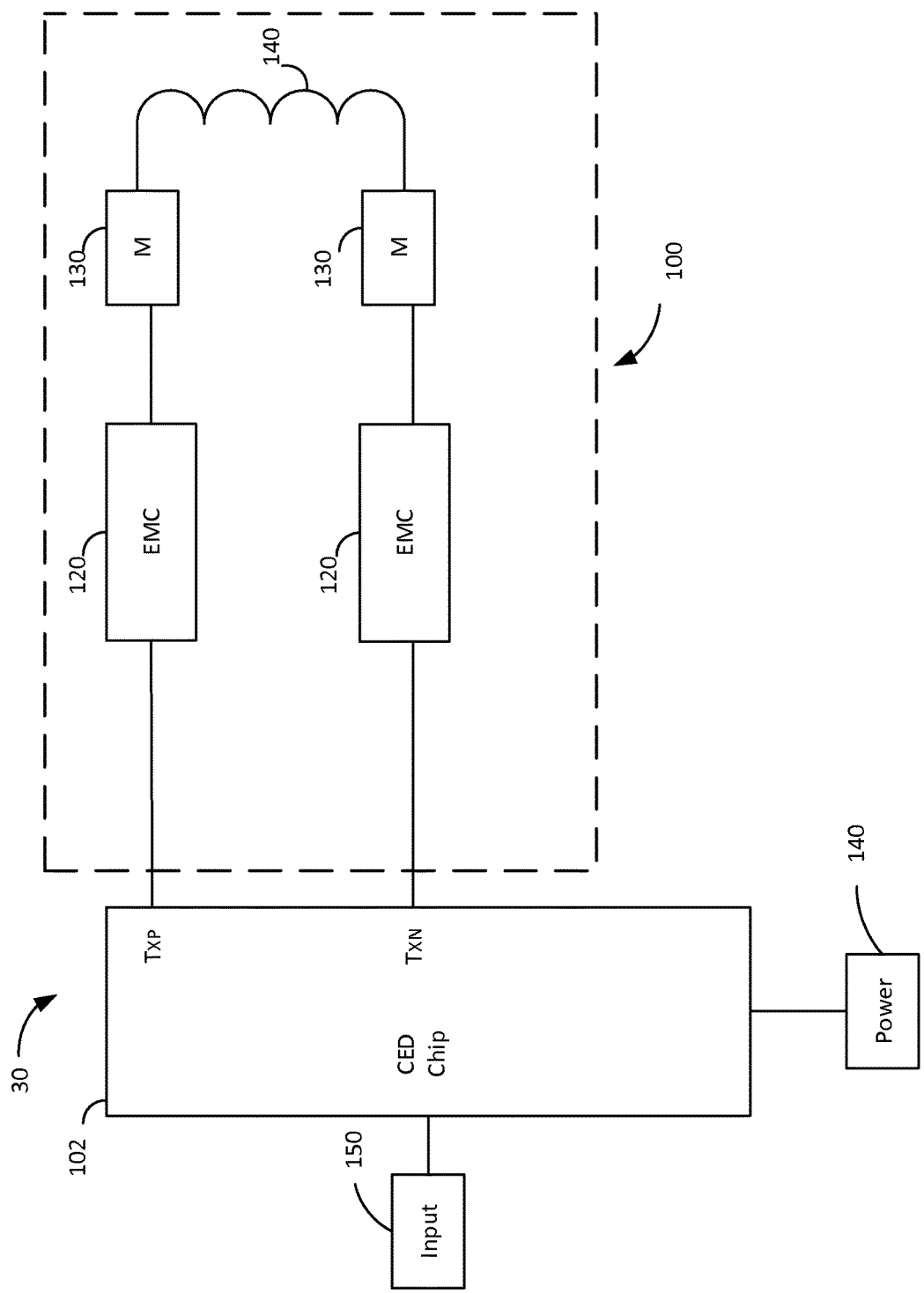
FIG. 2 shows an illustrative carrier emitting device in accordance with some embodiments of the present disclosure.

FIG. 2 depicts a block diagram of CED 30 in accordance with some embodiments of the present disclosure. Although CED 30 may include additional hardware and software for performing additional functions such as providing an inductive charge to a battery of an electronic device, or functioning as an NFC reader, FIG. 2 depicts a CED for providing a wireless carrier signal without this additional circuitry.

Although particular components are depicted in a particular arrangement in FIG. 2, it will be understood that CED 30 may include additional components, one or more of the components depicted in FIG. 2 may not be included in CED 30, and the components of CED 30 may be rearranged in any suitable manner. In one embodiment, CED 30 includes CED chip 102, CED transmission circuit 100, power supply 140, and input 150.

CED chip 102 of CED 30 may include any suitable hardware, software, memory, and circuitry as is necessary to perform and control the functions of CED 30. In one embodiment, CED chip 102 includes one or more processing units that execute instructions stored in memory of CED chip 102 to control the operations and processing of CED 30. As used herein, a processor or processing unit may include one or more processors having processing capability necessary to perform the processing functions described herein, including but not limited to hardware logic, computer readable instructions running on a processing unit, or any suitable combination thereof. A processing unit may run software to perform the operations described herein, including software accessed in machine readable form on a tangible non-transitory computer readable storage medium, as well as software that describes the configuration of hardware such as hardware description language (HDL) software used for designing chips.

As used herein, memory may refer to a tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, flash memory, disks or optical storage, magnetic storage, or any other non-transitory medium that stores information that is accessed by a processing unit or computing device.

CED chip 102 may also include additional circuitry such as analog front end circuitry and circuitry for interfacing with power interface 140 (e.g., power management circuitry, power conversion circuitry, rectifiers, and battery charging circuitry) and input 150. In one embodiment, analog front end circuitry of CED chip 102 includes circuitry for interfacing with the analog components of CED transmission circuit 100 (e.g., electromagnetic compatibility (EMC) circuitry, matching circuits, and modulation circuitry, and measurement circuitry).

Power supply 140 may include one or more power supplies such as a physical connection to AC power or a battery. Power supply 140 may include power conversion circuitry for converting AC power and/or generating a plurality of DC voltages for use by components of CED 30. When power supply 140 includes a battery, the battery may be charged via a physical power connection, via inductive charging, or via any other suitable method.

Input 150 includes any suitable input interface for providing user interaction with CED chip 102 of CED 30, such as buttons, switches, a touch screen, a key pad, a wired communication interface (e.g., USB, Ethernet, FireWire), or a wireless communication interface (e.g., WiFi, Bluetooth, ZigBee). In some embodiments, input 150 of CED 30 may allow a user to control certain operational parameters of CED 30 such as applying power to the CED 30, initiating CED 30 to send a wireless carrier signal, and selecting between operating modes (e.g., for a CED 30 that is capable of functioning as an inductive charger, or a reader that may operate in a CED mode).

CED chip 102 of CED 30 is in communication with CED transmission circuitry 100 via a plurality of pins such as a positive transmit pin (TxP) and a negative transmit pin (TxN). Transmit pins TxP and TXN may provide a carrier signal that is provided to the CED transmission circuitry 100 for transmission.

The carrier signal may be provided to EMC circuit 120. EMC circuit 120 may include one or more components such as inductors and capacitors in order to provide acceptable electromagnetic compatibility with other high-frequency signals. The output of EMC circuit 120 may be provided to matching circuits 130. Matching circuit 130 may include suitable components such as resistors, inductors, and capacitors to provide for impedance matching and tuning of antenna 140.

During operation of CED chip 102 of CED 30 in coupling mode, transmit pins TxP and TxN may output a carrier signal having a fixed frequency such as 13.56 MHz. EMC circuit 120 and matching circuit 130 smooth the output waveform of the carrier signal, for example, by modifying the approximate square wave output such that the signal transmitted by the antenna 140 approximates a sinusoidal wave. The carrier signal is then transmitted over antenna 140 for use by a plurality of devices such as first contactless device 20 and second contactless device 25.

In one embodiment, the CED chip 102 and CED transmission circuit 100 can be configured such that the CED 30 can be used as a wireless charging device. In other embodiments, the CED chip 102 and CED transmission circuit 100 can be configured such that the CED can be used as a NFC initiator/reader device. In one embodiment, the CED transmission circuitry 100 of CED 30 can include a receive circuit (not depicted) that can receive the coupled wireless signal such that an electronic device such as first contactless device 20 may instruct CED 30 to operate in a coupling mode. CED 30 may initially be operating in a reader/initiator mode. An electronic device such as first contactless device 20 may be operating in a target mode and may send data that tells CED 30 to switch to a coupling mode. CED 30 may then provide only the wireless carrier signal and first contactless device 20 may switch to an initiator mode to communicate with a target device. In other embodiments, a CED 30 with a plurality of operating modes may switch to the coupling mode based on an input such as input 150.

In one embodiment, when operating in coupling mode, the CED 30 can provide a continuous or uninterrupted near field 35 that has a predetermined signal strength to enable uninterrupted communication between the first contactless device 20 and the second contactless device 25. The CED 30 can continue to operate in coupling mode until the CED 30 receives a further instruction from the first contactless device 20 or input 150 indicating that the communication event has completed and the CED 30 can exit the coupling mode. In another embodiment, the CED 30 can remain in coupling mode for a predetermined time period and then exit coupling mode or provide a prompt to the first contactless device 20 to check on whether additional time is needed for the coupling mode.

Figure 3:
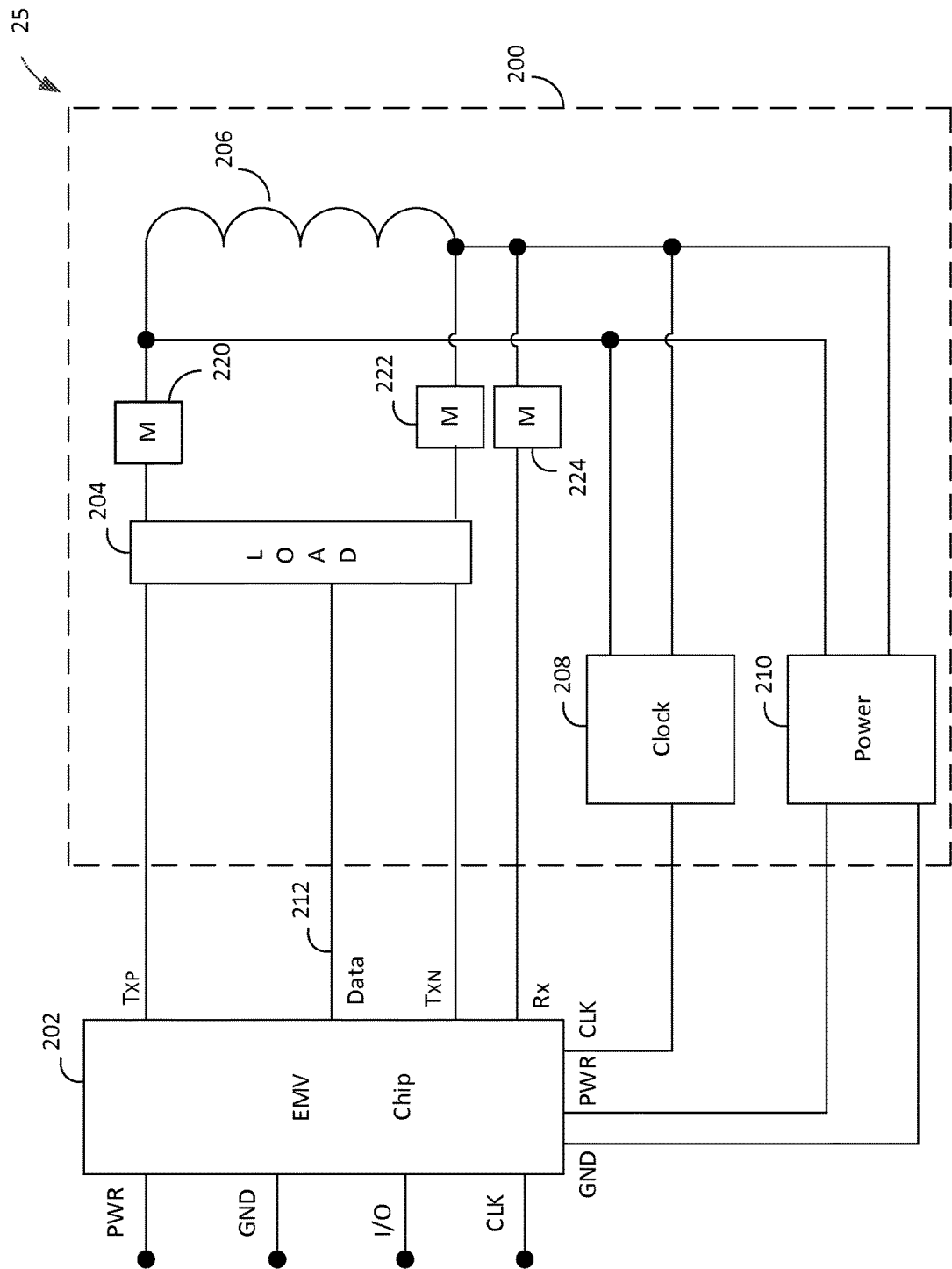
FIG. 3 shows an illustrative contactless device configured as an EMV card in accordance with some embodiments of the present disclosure.

FIG. 3 depicts an exemplary second contactless device 25 configured as an EMV card in accordance with some embodiments of the present disclosure. Although EMV card 25 is depicted as a simplified block diagram having a particular arrangement of blocks, it will be understood that various types of EMV circuits may be implemented with one or more blocks removed, additional blocks added, or one or more of the blocks rearranged. In the EMV card 25 depicted in FIG. 3, EMV card 25 does not have a power source but instead receives power through inductive coupling of the wireless carrier signal from the CED 30.

In one embodiment, EMV card 25 includes an EMV circuit 200 and an EMV chip 202. EMV chip 202 may include a processing unit and memory that are configured to control and perform the necessary operation of EMV card 25. In an exemplary embodiment, a processing unit of EMV chip 202 may be a microprocessor running instructions stored in memory of the EMV chip 202. EMV chip 202 may include a number of pins to interconnect with EMV circuit 200, such as a positive transmit pin ($T_{XP}$) a negative transmit pin ($T_{XN}$), a data pin (DATA), a receive pin ($R_X$), a clock pin (CLK), a power pin (PWR), and a ground pin (GND). Although a particular set of pins are depicted in FIG. 3, it will be understood that EMV chip 202 may include any suitable pins as necessary to implement the functions of EMV circuit 200.

EMV chip 202 also includes pins for inputs of power (PWR), ground (GND), input/output (I/O), and a clock (CLK) from a contact plate for interfacing with contact pins of a reader. The contact plate includes a communication pin for communicating with the reader when the EMV card is inserted in the reader and in direct electrical communication with the reader. The contact plate can also include a reset pin, a programming voltage pin, and two auxiliary pins.

EMV circuit 200 may be any suitable circuit that is configured to receive and modulate a wireless carrier signal and provide operating inputs (e.g., power and a clock signal) to EMV chip 202. In one embodiment, EMV circuit 200 includes an antenna 206, matching circuit 220/222/224, load 204, clock recovery circuit 208, and power circuit 210. Matching circuit 220/222/224 includes components such as inductors, capacitors, and resistors having values and a physical arrangement such that the impedance is matched with the antenna 206. The antenna is tuned to a frequency associated with a carrier signal that is received from a transmitting device such as the CED 30.

When the antenna 206 of EMV circuit 200 is within the range of a carrier signal provided by the CED 30, the antennas of the EMV card 25 and CED 30 behave like a transformer. The alternating current created by the carrier signal creates an electromagnetic field which induces a current in antenna 206. Clock recovery circuit 208 and power circuit 210 are coupled across antenna 206. Although depicted as components of EMV circuit 200, it will be understood that clock recovery circuit and power circuit may be components of EMV chip 202. Clock recovery circuit 208 outputs the clock reference signal for EMV chip 202 based on the frequency of the carrier signal and provides the clock signal to the CLK pin of EMV chip 202. Power recovery circuit 210 (e.g., a diode rectifier circuit) converts the received AC signal into a DC signal that is provided to the PWR and GND pins of EMV chip 202. EMV chip 202 is able to execute instructions to perform the EMV functionality of EMV device 25 once the power and clock signals are received.

EMV chip 202 may operate in accordance with EMV and wireless card standards such as ISO 14443. EMV chip 202 receives the wireless carrier signal, and when the first contactless device 20 is also inductively coupled via the near field emitted by the CED 30, a modulated version of the wireless carrier signal. When the received signal has been modulated, EMV chip 202 demodulates the signal to extract the data transmitted from the first contactless device 20 and executes instructions based on the received data. For example, the first contactless device 20 may function as an initiator of an electronic transaction and the EMV device 25 may function as a target in accordance with one or more EMV and wireless card standards. The first contactless device 20 provides instructions to EMV chip 202 and queries EMV chip 202 for data, and the EMV chip 202 operates in accordance with those instructions and queries. EMV chip 202 may also receive other data from a reader such as firmware updates or configuration data.

EMV chip 202 transmits data to the first contactless device 20 by providing a modulation signal to EMV circuit 200. Although EMV chip 200 may generate a modulation signal in any suitable manner, such as by active or passive load modulation, in one embodiment EMV chip 202 controls a data line 212 that switches load 204 in and out of the transmission circuit. When data is to be transmitted from the EMV chip 202 to the reader, EMV chip 202 selectively switches the load 204 in and out of the circuit in accordance with a modulation method. As a result of this switching, the RF characteristics of the inductive coupling between the antenna 206 and the antennas of the CED 30 and the first contactless device 20 are changed. This results in a change of the amplitude and/or phase of the wireless carrier signal, which may be sensed by the first contactless device 20. The first contactless device 20 demodulates the sensed changes in the wireless carrier signal to extract the data that was transmitted from the EMV card 25.

Figure 4:
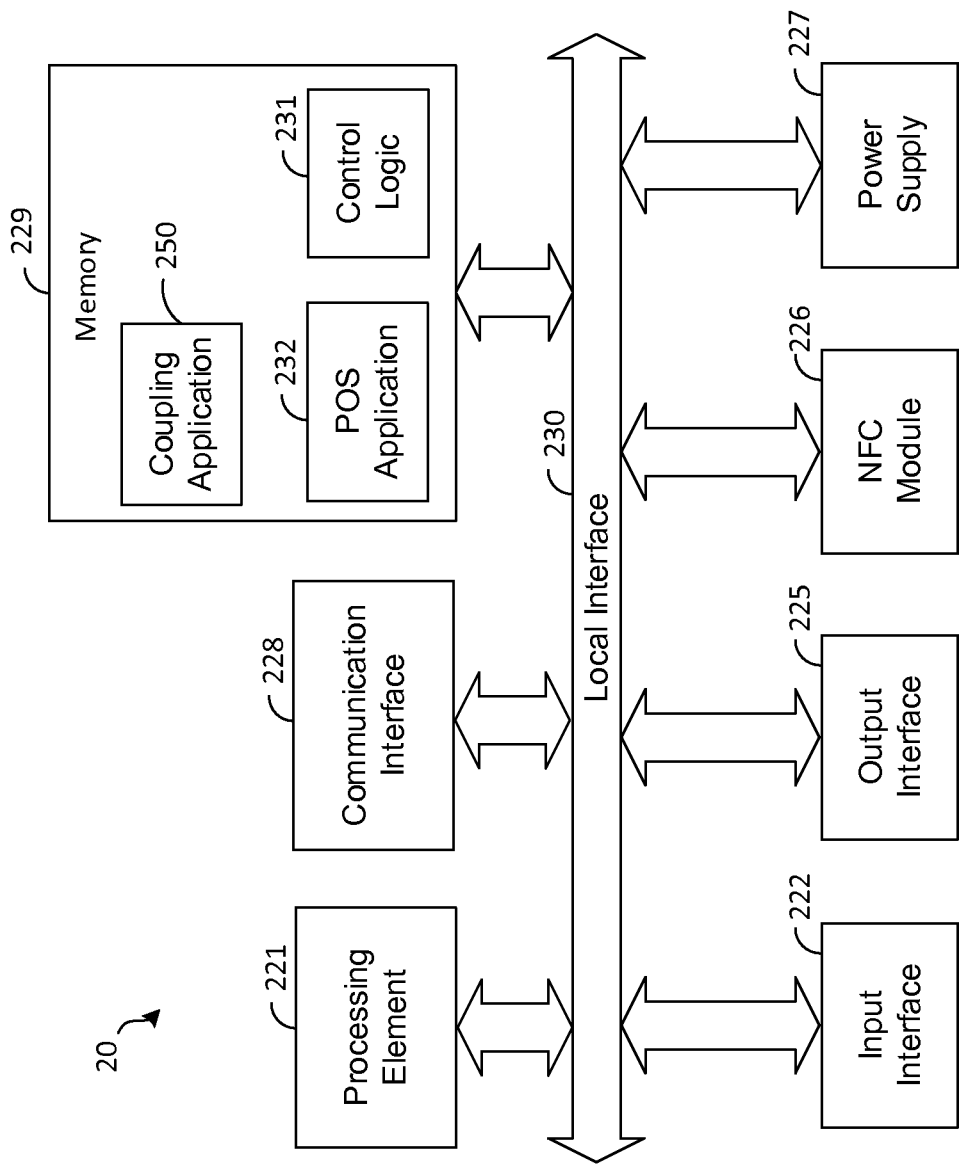
FIG. 4 shows another illustrative contactless device in accordance with some embodiments of the present disclosure.

FIG. 4 depicts an exemplary first contactless device 20 configured as a portable electronic device in accordance with some embodiments of the present disclosure. Although the first contactless device 20 is depicted in FIG. 4 as a simplified block diagram having a particular arrangement of blocks, it will be understood that various types of components may be implemented with one or more blocks removed, additional blocks added, or one or more of the blocks rearranged.

In one embodiment, the first contactless device 20 includes a processing element 221 and memory 229 that are configured to control and perform the necessary operations of the first contactless device 20. In an exemplary embodiment, the processing element 221 of the first contactless device 20 may be a general purpose processor running instructions for a mobile operating system, programs, and applications that may be stored in memory 229. First contactless device 20 may be any mobile electronic device capable of communicating with other devices using NFC. As an example, the first contactless device 20 may be implemented as a cellular telephone or smart phone, a tablet computer, a laptop computer, a smart watch, a handheld computer, a wearable computer, or a personal digital assistant (PDA).

The processing element 221 of first contactless device 20 communicates with and drives the other elements within the first contactless device 20 via a local interface 230, which can include at least one bus. An input interface 222, such as a keyboard, keypad, touchpad, stylus or mouse, may be used by a user to input data, and an output interface 225, for example a display screen, can be used to output data to the user of the first contactless device 20. Note that the input interface 222 and output interface 225 may share components for performing their respective operations. As an example, a touchscreen may be used to display images and also to receive inputs from a user. The first contactless device 20 also has a power supply 227, such as a battery, which provides electrical power to the components of the first contactless device 20. First contactless device also includes a communication interface 228 that enables wired communications (e.g., USB, Ethernet, FireWire) and/or wireless communications (e.g., WiFi, Bluetooth, ZigBee). An NFC module 226 is used to enable the first contactless device 20 to communicate wirelessly with other NFC devices using NFC. In one embodiment, the second contactless device 25 can be configured similar to the first contactless device 20 of FIG. 4.

The memory 229 of first contactless device 20 includes instructions for control logic 231 for controlling various functions of the first contactless device 20, instructions for a coupling application 250 for operating the first contactless device as an initiator and switching between operating modes, and instructions for a point-of-sale application 232 for graphically rendering via the output interface 225 a payment application and communicating with a payment server to process transactions. In the embodiment FIG. 4, each of the control logic 231, the coupling application 250 and point-of-sale application 232 are implemented in software and stored in memory 229.

As an example, the coupling application 250 may be designed to provide functionality to enable the NFC module 226 of the first contactless device 20 to communicate with the second contactless device 25 when the near field 35 is provided by the CED 30. The coupling application 250 can prompt the NFC module 226 to change the modulation of the near field 35 such that the first contactless device 20 operates similar to an NFC initiator/reader device instead of an NFC target/payment device.

In one embodiment, in order to transition the first contactless device 20 from operation as an NFC target device to an NFC initiator device, a user of the first contactless device 20 may initiate a coupling mode of operation in the first contactless device 20. The user can initiate coupling mode operation by providing an input to the first contactless device 20 via input interface 222 in response to selectable options being displayed on the output interface 225. In one embodiment, the user can initiate the coupling through a display provided by the point-of-sale application 232. The first contactless device 20 can receive the user selection from input interface 222 and can execute the coupling application 250 to provide instructions to the NFC module 226 to operate as an initiator device in a coupling mode in response to receiving the user input. Once the communication event has ended that requires the first contactless device 20 to operate in coupling mode, the user can select another displayed option on output interface 225 to transition the first contactless device 20 back to operation as an NFC target device. The first contactless device 20 receives the input from input interface 222 to resume operation as an NFC target device and the coupling application 250 can provide the corresponding instructions to NFC module 226 to operate as an NFC target device.

Figure 5:
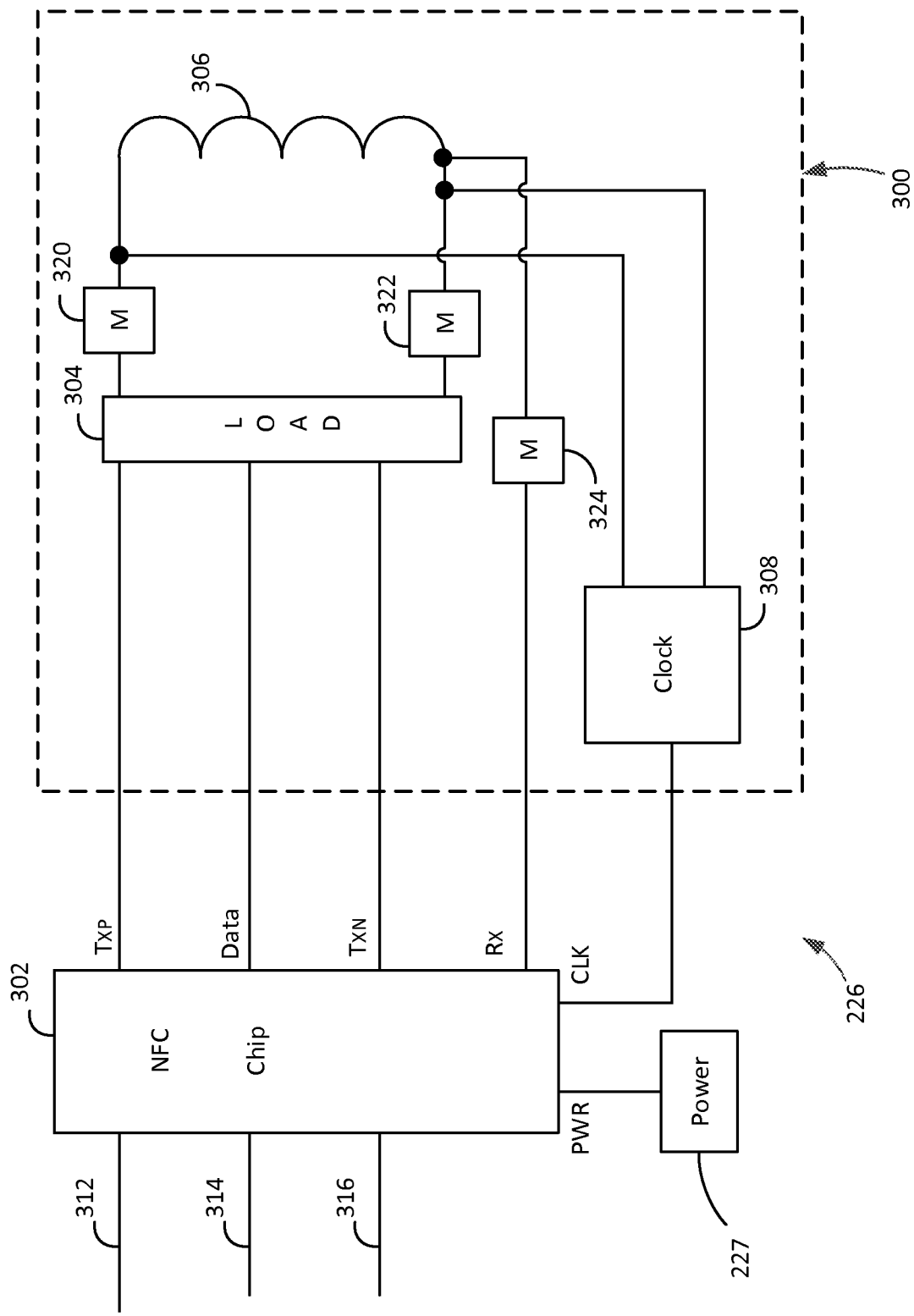
FIG. 5 shows an illustrative NFC module of the contactless device of FIG. 4 in accordance with some embodiments of the present disclosure.

FIG. 5 depicts an exemplary NFC module 226 in accordance with some embodiments of the present disclosure. Although NFC module 226 is depicted as a simplified block diagram having a particular arrangement of blocks, it will be understood that various types of NFC circuits may be implemented with one or more blocks removed, additional blocks added, or one or more of the blocks rearranged. In one embodiment, NFC module 226 includes an NFC circuit 300 and an NFC chip 302. NFC chip 302 may include a processing unit and memory that are configured to control and perform the necessary operation of NFC device.

NFC chip 302 may include a number of pins to interconnect with NFC circuit 300, such as a positive transmit pin (Tx$_P$) a negative transmit pin (Tx$_N$), a receive pin (Rx), a clock pin (CLK), and a power pin (PWR). Although a particular set of pins are depicted in FIG. 5, it will be understood that NFC chip 302 may include any suitable pins as necessary to perform the functions of NFC circuit 300. NFC chip 302 also includes pins 312, 314 and 316 for inputs from other components of the first contactless device 20, such as signals or communications from the coupling application 250 and point-of-sale application 232.

NFC circuit 300 may be any suitable circuit that is configured to receive and modulate a wireless carrier signal and provide operating inputs (e.g., a clock signal) to NFC chip 302. In one embodiment, NFC circuit 300 includes an antenna 306, and matching circuit 320/322/324, and clock recovery circuit 308. Matching circuit 320/322/324 includes components such as inductors, capacitors, and resistors having values and a physical arrangement such that the impedance is matched with the antenna 306. The antenna is tuned to a frequency associated with a wireless carrier signal that is received from the CED 30.

NFC chip 302 may operate in accordance with NFC and wireless card standards such as ISO 14443 and ISO 18092. NFC chip 302 receives the wireless carrier signal, and when either an NFC reader device or the second contactless device 25 is transmitting, a modulated version of the wireless carrier signal. When the received signal is modulated, NFC chip 302 demodulates the signal to extract the data transmitted from the second contactless device 25 if operating as an initiator in coupling mode or from the NFC reader device if operating as an NFC target/payment device, and executes instructions based on the received data. For example, the first contactless device 20 may function as an NFC target device for an electronic transaction (when not in coupling mode) with an NFC reader device in accordance with one or more NFC and wireless standards. The NFC reader provides instructions to NFC chip 302 and queries NFC chip 302 for data, and the NFC chip 302 operates in accordance with those instructions and queries. NFC chip 302 may also receive other data from the NFC reader device such as firmware updates or configuration data.

The NFC chip 302 monitors the signals at antenna 306 via receive pin Rx. In this manner, NFC chip 302 can monitor what is being transmitted (e.g., the carrier and modulated signals) as well as modulations that are applied to the wireless carrier signal by the second contactless device 25 or an NFC reader device. Based on the modulations of the received signal, NFC chip 302 is able to receive communications from the second contactless device 25 or an NFC reader device.

The NFC chip 302 also transmits data to the second contactless device 25 or an NFC reader device by providing a modulation signal to NFC circuit 300. The NFC chip 302 can use either active or passive modulation techniques to modulate the carrier signal of near field 35 to transmit data. When using passive modulation techniques the NFC chip 302 may modulate the carrier signal in a manner similar to the EMV card described above (not depicted in FIG. 5). Although active load modulation may be performed in any suitable manner, in one embodiment NFC chip 300 may generate a data signal with NFC circuit 300 when the first contactless device 20 is transmitting data. The data signal generated by NFC circuit 300 may have the same frequency (e.g., 13.56 MHz) and phase as the wireless carrier signal received from CED 30 in the near field 35, and may be used to modulate the wireless carrier signal at antenna 306. When a modulated wireless carrier signal provided by the NFC circuit 300 is received by the second contactless device 25, the effective signal received by the second contactless device 25 may be similar to a signal provided by an NFC reader. Second contactless device 25 may demodulate the sensed changes from the wireless carrier signal to extract the data that was transmitted from the first contactless device 20.

The first contactless device 20 can use one modulation method when operating in coupling mode, i.e., when the portable electronic device is operating like an NFC initiator device, and a second modulation method when the portable electronic device is not in coupling mode and operating as an NFC target device. In one embodiment, the first contactless device 20 may use either Type A modulation or Type B modulation for coupling mode operation, and may utilize modulation methods for modulating the wireless carrier signal as required to function as either an initiator or target. For example, under any NFC modulation technique, the modulation method that is used may depend on whether the NFC device is an initiator or a target. Moreover, the differing modulation methods may also utilize different encoding procedures, again depending on whether the NFC device is operating as an initiator or a target.

In one embodiment, the NFC circuit 300 can include a power recovery circuit (not depicted) to enable wireless charging of the first contactless device 20. When the antenna 306 of NFC circuit 300 is within the range of an inductive charging signal provided by the CED 30, the antennas of the first contactless device 20 and CED 30 behave like a transformer. The alternating current created by the carrier signal creates an electromagnetic field which induces a current in antenna 306. The power recovery circuit can be coupled across antenna 306. The power recovery circuit converts the received AC signal into a DC signal that is provided to a power supply 227 (e.g., a battery) of the first contactless device 20

Figure 6:
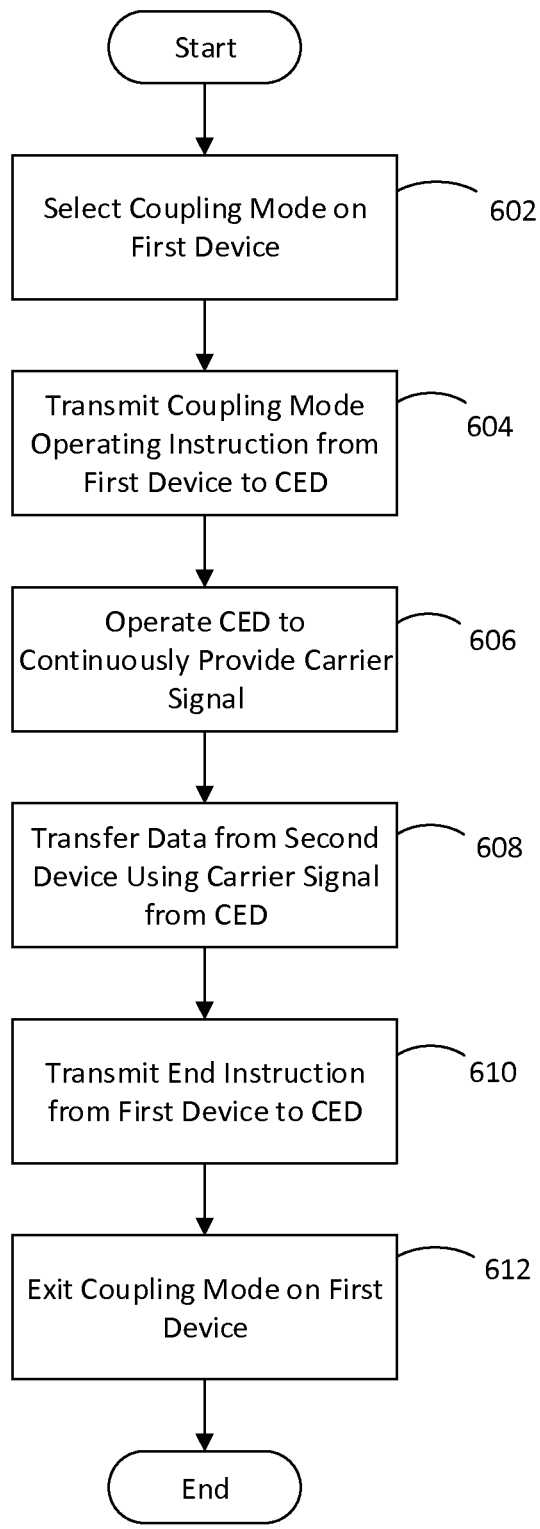
FIG. 6 depicts a non-limiting flow diagram illustrating exemplary methods for transferring data using the near field communication coupling system.

In view of the structures and devices described supra, methods that can be implemented in accordance with the disclosed subject matter will be better appreciated with reference to the flowchart of FIG. 6. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts a process 600 for communicating data between two portable electronic devices with a carrier signal provided by a carrier emitting device according to some embodiments of the present disclosure. At step 602, a user selects the coupling mode option on the first contactless device 20 to initiate coupling mode operation on the first contactless device 20. During coupling mode operation, the first contactless device 20 operates like a NFC initiator device in order to communicate with a second (target) contactless device 25 and receive data such as payment information from the second contactless device 25. If the first contactless device 20 and second contactless device 25 are not in close proximity to the CED 30, i.e., within about 10 cm or less, the first contactless device 20 has to be moved into close proximity of the first contactless device. In addition, the CED 30 has to be powered on and emitting the carrier signal via near field 35 for the first contactless device 20 to communicate with the second contactless device 25 as an initiator.

At step 604, in one embodiment, the first contactless device 20 communicates with the CED to instruct the CED 30 to operate in a coupling mode. This communication may be provided by modulation of the wireless carrier signal within the near field 35 (e.g., with first contactless device 20 initially functioning as an NFC target) or another communication interface such as Bluetooth. The CED 30 can receive the instruction from the first contactless device 20 and switch into coupling mode operation. In coupling mode operation, the CED 30 stops its current mode of operation (e.g., as a NFC reader) and begins operating as a carrier emitting device according to the instructions from the first contactless device 20.

At step 606, the CED 30 operates in coupling mode to continuously provide the wireless carrier signal to facilitate communication between the first contactless device 20 and the second contactless device 25. The CED 30 continuously provides the carrier signal to ensure that the communications between the first contactless device 20 and the second contactless device 25 are not interrupted due to a loss of the carrier signal. The CED 30 can also provide the carrier signal at a predetermined power level. The predetermined power level can be the maximum power level of the CED 30 in one embodiment, but could be a different power level in other embodiments. In addition, if the second contactless device 25 is not in proximity to the CED 30, the second contactless device 25 has to be placed in proximity to CED 30 to communicate data to the first contactless device 20.

At step 608, the first contactless device 20 and second contactless device 25 may communicate data by modulating the wireless carrier signal that is provided by the CED 30. As the initiator, the first contactless device may modulate the wireless carrier signal to establish communications with the second contactless device 25. The second contactless device 25 can receive and demodulate the transmission from the first contactless device 20. The second contactless device 25 can then modulate the wireless carrier signal to transmit data to the first contactless device 20. In one embodiment, the data communicated by the second contactless device 25 may include payment information such as an encrypted credit card number. The exchange of messages and/or data between the first contactless device 20 and the second contactless device 25 can continue for as long as necessary in order to transfer all of the data between the first contactless device 20 and the second contactless device 25. Once the data transfer has been completed, the process can proceed to step 610.

At step 610, the first contactless device 20 may transmit a message to the CED 30 instructing the CED 30 to end coupling mode operation. Although the message may be transmitted in any suitable manner as described at step 604, in one embodiment the CED 30 may monitor the modulated wireless carrier signal for a particular message or modulation scheme that indicates that the wireless carrier signal should be turned off. When the CED 30 receives the instruction to end coupling mode operation, the CED 30 returns to its previous operating state, powers off, or enters a power saving mode of operation. Processing may then continue to step 612.

At step 612, the first contactless device 20 exits coupling mode operation and returns to operation similar to an NFC target device. In other words, the first contactless device 20 returns to a mode of operation that executes instructions to enable the first contactless device to operate as NFC target device. When not in coupling mode, the first contactless device 20 can be scanning for a message from an NFC reader looking for payment information or other data from the first contactless device 20. Upon receipt of such a message, the first contactless device 20 can provide a modulated signal to the NFC reader using a modulation method for an NFC target device.

In one embodiment, more than one second contactless device 25 can be placed in proximity to the CED 30 and communicate with the first contactless device 20 using a modulated signal based on the carrier signal from the CED 30. In such an embodiment, the first contactless device 20 can transmit the same data to multiple second contactless devices 25 in a single communication event instead of having to communicate with each of the second contactless devices 25 individually.

In another embodiment, the CED 30 can be configured as a modular component that can be combined with the first contactless device 20. For example, the CED 30 can be configured as a case for the first contactless device 20. When the first contactless device 20 is placed in the case, i.e., the CED 30, the first contactless device 20 could then be operated like an NFC initiator/reader device.

In further embodiments, to extend the communication range between the first contactless device 20 and the second contactless device 25, multiple CEDs 30 may be used or one or more repeaters may be used with a CED 30. The use of multiple CEDs 30 or repeaters can extend the range of the near field 35 and thereby extend the communication range of the first contactless device and the second contactless device.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A first contactless device comprising:
an interface configured to receive an indication of a first mode of operation or a second mode of operation;
an antenna configured to receive a wireless carrier signal provided by a carrier emitting device separate from the first contactless device during operation of the first contactless device in either the first mode of operation or the second mode of operation;
a memory storing a first set of instructions associated with the first mode of operation and a second set of instructions associated with the second mode of operation, wherein the first set of instructions comprise instructions to provide a first modulation signal according to a first modulation method, and wherein the second set of instructions comprise instructions to initiate wireless communications with a second contactless device via the wireless carrier signal provided by the carrier emitting device, to provide a second modulation signal according to a second modulation method, and to instruct the carrier emitting device to operate in a coupling mode to facilitate direct communication between the first contactless device and the second contactless device via the wireless carrier signal provided by the carrier emitting device; and
a processing unit configured to execute the first set of instructions in response to the indication of the first mode or the second set of instructions in response to the indication of the second mode, wherein the first contactless device is configured to modulate the wireless carrier signal based on the first modulation signal or the second modulation signal.

2. The first contactless device of claim 1, wherein a modulated wireless carrier signal generated according to the second modulation method is received by the second contactless device, and wherein the antenna is configured to receive a second modulated wireless carrier signal from the second contactless device, the second modulated wireless carrier signal based on a modulation of the wireless carrier signal according to the first modulation method.

3. The first contactless device of claim 2, wherein the processing unit is configured to demodulate the second modulated wireless carrier signal to determine received data.

4. The first contactless device of claim 1, wherein the carrier emitting device is configured to continuously provide the wireless carrier signal upon operation in the coupling mode.

5. The first contactless device of claim 4, wherein in the second mode of operation, the second modulation signal provides data that instructs the carrier emitting device to operate in the coupling mode and continuously provide the wireless carrier signal.

6. The first contactless device of claim 1, wherein the first modulation signal according to the first modulation method provides payment information stored in memory to a reader device.

7. The first contactless device of claim 1, wherein the first modulation method and the second modulation method utilize different encoding procedures.

8. The first contactless device of claim 1, wherein the interface comprises a user interface, and wherein the user interface is configured to receive the indication of the first mode of operation or the second mode of operation from a user.

9. A method for a first contactless device to communicate with a second contactless device, the method comprising:
receiving an indication at an interface of the first contactless device indicating a first mode of operation or a second mode of operation;
executing a first set of instructions with a processing unit of the first contactless device in response to receiving the indication of the first mode of operation;
generating a first modulation signal according to a first modulation method in response to executing the first set of instructions;
executing a second set of instructions with the processing unit of the first contactless device in response to receiving the indication of the second mode of operation;
generating a second modulation signal according to a second modulation method in response to executing the second set of instructions;

receiving a wireless carrier signal provided by a carrier emitting device separate from the first contactless device with an antenna of the first contactless device during operation of the first contactless device in either the first mode of operation or the second mode of operation;

instructing the carrier emitting device to operate in a coupling mode to facilitate direct communication between the first contactless device and the second contactless device via the wireless carrier signal provided by the carrier emitting device in response to executing the second set of instructions; and modulating the wireless carrier signal provided by the carrier emitting device based on either the first modulation signal or the second modulation signal and transmitting a modulated wireless carrier signal over the antenna.

10. The method of claim 9, wherein modulating the wireless carrier signal includes modulating the wireless carrier signal based on the second modulation signal generated according to the second modulation method, the method further comprising receiving, by the antenna, a second modulated wireless carrier signal from the second contactless device, the second modulated wireless carrier signal based on a modulation of the wireless carrier signal according to the first modulation method in response to the second contactless device receiving the modulated wireless carrier signal from the first contactless device.

11. The method of claim 10, further comprising demodulating the second modulated wireless carrier signal with the processing unit to determine received data.

12. The method of claim 9, wherein the carrier emitting device is configured to continuously provide the wireless carrier signal upon operation in the coupling mode.

13. The method of claim 12, wherein the instructing the carrier emitting device to operate in a coupling mode includes instructing the carrier emitting device, via data provided by the second modulation signal, to continuously provide the wireless carrier signal.

14. The method of claim 9, wherein the first modulation signal according to the first modulation method provides payment information stored in memory to a reader device.

15. The method of claim 9, wherein the first modulation method and the second modulation method utilize different encoding procedures.

16. The method of claim 9, wherein receiving the indication at an interface comprises receiving a selection, by a user, at a user interface of the first mode of operation or the second mode of operation.

17. A non-transitory computer-readable storage medium of a first contactless device comprising instructions stored therein, which when executed by one or more processors, cause the one or more processors to perform operations comprising:

receiving an indication from an interface of the first contactless device indicating a first mode of operation or a second mode of operation;

executing a first set of instructions in response to the selection indicating the first mode of operation;

generating a first modulation signal according to a first modulation method in response to executing the first set of instructions;

executing a second set of instructions in response to the selection indicating the second mode of operation;

generating a second modulation signal according to a second modulation method in response to executing the second set of instructions;

modulating a wireless carrier signal provided by a carrier emitting device separate from the first contactless device based on either the first modulation signal or the second modulation signal to generate a modulated wireless carrier signal; and instructing the carrier emitting device to operate in a coupling mode to facilitate direct communication between the first contactless device and the second contactless device via the wireless carrier signal provided by the carrier emitting device in response to executing the second set of instructions.

18. The non-transitory computer-readable storage medium of claim 17, wherein the second modulation signal is generated according to the second modulation method and the instructions further comprise instructions that cause the one or more processors to perform operations comprising:

communicating the modulated wireless carrier signal to a second contactless device; and receiving, from an antenna, a second modulated wireless carrier signal from the second contactless device, the second modulated wireless carrier signal based on a modulation of the wireless carrier signal according to the first modulation method in response to the second contactless device receiving the modulated wireless carrier signal.

19. The non-transitory computer-readable storage medium of claim 18, wherein the instructions further comprise instructions that cause the one or more processors to perform operations comprising demodulating the second modulated wireless carrier signal to determine received data.

20. The non-transitory computer-readable storage medium of claim 17, wherein the carrier emitting device is configured to continuously provide the wireless carrier signal upon operation in the coupling mode.

21. The non-transitory computer-readable storage medium of claim 20, wherein the instructing the carrier emitting device to operate in a coupling mode includes instructing the carrier emitting device, via data provided by the second modulation signal, to continuously provide the wireless carrier signal.

22. The non-transitory computer-readable storage medium of claim 17, wherein the first modulation signal according to the first modulation method provides payment information stored in memory to a reader device.

23. The non-transitory computer-readable storage medium of claim 17, wherein the first modulation method and the second modulation method utilize different encoding procedures.

24. The non-transitory computer-readable storage medium of claim 17, wherein receiving the indication from the interface comprises receiving a selection, by a user, of the first mode of operation or the second mode of operation.

* * * * *